United States Patent [19]

Kasper

[11] Patent Number: 5,052,426
[45] Date of Patent: Oct. 1, 1991

[54] SYSTEM FOR PRESSURE LETDOWN OF ABRASIVE SLURRIES

[75] Inventor: Stanley Kasper, Pittsburgh, Pa.

[73] Assignee: The United States of America as represented by the United States Department of Energy, Washington, D.C.

[21] Appl. No.: 641,988

[22] Filed: Jan. 16, 1991

[51] Int. Cl.$^5$ ............................................. F17C 13/00
[52] U.S. Cl. ..................................... 137/14; 137/572; 137/195; 137/587
[58] Field of Search .................. 137/571, 572, 14, 587, 137/192, 154, 195

[56] References Cited

U.S. PATENT DOCUMENTS

| 1,386,301 | 8/1921 | Adair et al. | |
|---|---|---|---|
| 1,853,474 | 4/1932 | Tucker . | |
| 2,502,525 | 4/1950 | Krugler | 137/572 X |
| 2,582,819 | 1/1952 | Daily | 137/192 X |
| 3,908,718 | 9/1975 | Bower | 137/587 X |
| 4,019,524 | 4/1977 | Whitson | 137/14 |

Primary Examiner—Alan Cohan
Attorney, Agent, or Firm—David E. Breeden; Stephen D. Hamel; William R. Moser

[57] ABSTRACT

A system and method for releasing erosive slurries from containment at high pressure without subjecting valves to highly erosive slurry flow. The system includes a pressure letdown tank disposed below the high-pressure tank, the two tanks being connected by a valved line communicating the gas phases and a line having a valve and choke for a transfer of liquid into the letdown tank. The letdown tank has a valved gas vent and a valved outlet line for release of liquid. In operation, the gas transfer line is opened to equalize pressure between tanks so that a low level of liquid flow occurs. The letdown tank is then vented, creating a high-pressure differential between the tanks. At this point, flow between tanks is controlled by the choke. High-velocity, erosive flow through a high-pressure outlet valve is prevented by equalizing the start up pressure and thereafter limiting flow with the choke.

3 Claims, 1 Drawing Sheet

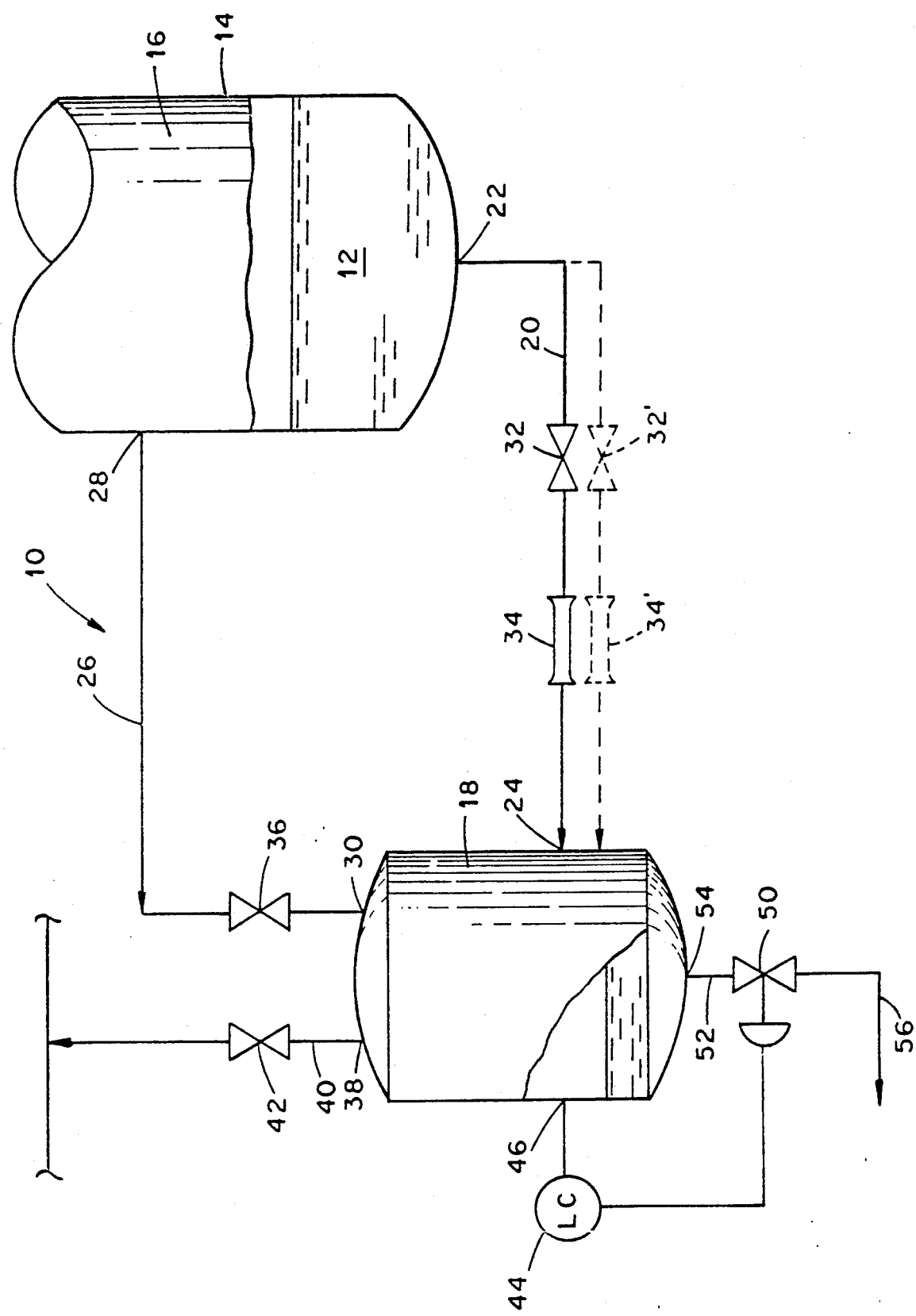

SYSTEM FOR PRESSURE LETDOWN OF ABRASIVE SLURRIES

The United States Government has rights in this invention pursuant to the employer-employee relationship between the U.S. Department of Energy and the inventor.

FIELD OF THE INVENTION

This invention relates generally to apparatus for transferring liquid slurries and more particularly to apparatus for transferring slurries from a high-pressure container.

BACKGROUND OF THE INVENTION

In many chemical processes it is necessary to react slurries at high pressure. Examples are pressure oxidation of ores and polymerization of monomers, for example, ethylene, in the presence of solid catalysts. There are particularly many such reactions in the field of coal conversion, that is, gasification, liquefaction, and more recently, combustion. Typically in such reactions, it is necessary to transfer the solids from a high-pressure zone to a low-pressure zone in order to process them further or discard them. If the pressure reduction occurs across a valve, extremely rapid erosion may occur, particularly when the valve is first "cracked," open and solid particles move at very high velocities. Valves in this service have been known to fail in a matter of minutes.

It is widely recognized in coal conversion research that slurry pressure letdown creates a severe erosion problem for valves. A number of research programs have been directed toward solving the problem either by new valve designs or development of superior materials of construction. Entire symposiums have been devoted to corrosion/erosion problems in coal conversion. Typical papers are "Corrosion/Erosion of Materials in Coal Liquefaction Environments" by Alan Levy and "Erosion Resistance of Ceramic Materials in Coal Slurry Letdown Service" by John J. Mueller, both included in the proceedings of Corrosion/Erosion of Coal Conversion Systems Materials Conference, Berkeley, Calif. Jan. 24–26, 1979. The petroleum production industry has faced a similar problem in brining up oil from reservoirs at great pressures and discharging it to storage at atmospheric pressure. Entrained sand particles create an erosive slurry. A key component developed by the industry has been the choke, a small diameter tubular restriction placed in the letdown line to take the major pressure drop. Descriptions of the design and use of chokes are well presented in "Petroleum Production," Wilbert F. Cloud, University of Oklahoma Press, 1939.

Means of circumventing the valve erosion problem in high-pressure slurry systems have been developed, in particular, "lock hoppering" wherein a slurry receiving vessel, or lock hopper, is equalized in pressure with the reactor. The slurry is then discharged batchwise to the receiving vessel by gravity flow. The receiving vessel is then valved off from the reactor and depressurized by venting the gases or vapors above the slurry level. A bottom discharge valve on the receiving vessel may then be opened and the slurry discharged by gravity. In practice, two receiving vessels are used so that one is collecting slurry while the other is discharging. This approach, however, has disadvantages of its own in that depressurizing may result in the loss of valuable product vapors or require special handling of hazardous gases. The valves must be operated frequently and incur rapid wear, particularly at high pressure when cycles are short. This type of device does not operate in a truly continuous manner. In spite of development of novel valve designs and more durable materials of construction, the excessive erosion of pressure letdown valves has remained a serious deterrent to the development of high-pressure coal conversion systems.

SUMMARY OF THE INVENTION

The present invention is directed to pressure letdown systems for transferring a liquid from a high-pressure container to discharge at atmospheric or only slightly elevated pressure. The invention includes a pressure letdown container spaced apart from and below the level of the high-pressure container and communicated with the latter through a valved pressure-equalizing line connected above the liquid level in both containers and a valved liquid flow line having a choke downstream of the valve. A valved pressure-release outlet line and discharge outlet are also provided in the letdown container, along with means for controlling the level of liquid therein. In operation of the system, the pressure-equalizing line is opened prior to opening the liquid flow line, thus eliminating the high-pressure differential existing at start up across the valve in the liquid flow line. After the valve in the liquid flow line is fully open, and the pressure in the letdown container is reduced, nearly the full pressure differential is taken across the choke and the liquid flow remains constant.

Systems embodying the invention avoid the problem of valve damage due to being exposed to erosive slurries at high velocity by reducing the pressure differential and liquid velocity across the valve at the liquid outlet at start up to a minimal value at or near reactor pressure and maintaining the flow rate in steady state operation by means of the choke. Pressure is equalized initially by flow of pressurized gas or vapor between the two containers, thus avoiding subjecting the liquid slurry phase to discharge under a high-pressure differential. The invention provides significant advantage in applications such as coal gasification processes involving handling of erosive slurries.

It is, therefore, an object of this invention to provide a system for transfer of a liquid from a pressurized container to discharge at low pressure without subjecting a discharge outlet valve to a high-pressure differential at any time.

Another object is to provide a system for transfer of an abrasive slurry from a high-pressure container to discharge at low pressure through a valve outlet line without exposing the valves in the line to high velocity flow of the slurry under a high-pressure differential.

Another object is to provide such a system wherein the flow velocity of the slurry through the liquid outlet of the container is maintained at a relatively low value.

Other objects and advantages of the invention will be apparent from the following detailed description and appended claims.

BRIEF DESCRIPTION OF THE DRAWINGS

The single drawing is a schematic view of a pressure letdown system embodying the invention.

DESCRIPTION OF THE PREFERRED EMBODIMENT

Referring to the drawing, there is shown a pressure letdown system 10 for discharging a slurry 12 containing abrasive solids from a pressurized tank 14 for release at atmospheric pressure. The slurry constitutes a liquid phase held under pressure by a gas phase 16 pressurized to a pressure such as 1,000 psig by means not shown. A letdown tank 18 is disposed for receiving the slurry and is positioned below the level of the tank 14 so that the slurry will flow by gravity in operation of the system.

Tank 18 is connected to tank 14 by a liquid line 20 communicating outlet 22 at the bottom of tank 14 with inlet 24 disposed in the side of the tank 18 and by gas-phase line 26 communicating outlet 28 above the liquid phase in tank 14 with inlet 30 at the top of tank 18. Liquid line 20 has a valve 32 and a choke 34 disposed therein for regulating flow as described below, and gas-phase line 26 includes a valve 36 controlling flow of pressurized gas between the tanks. Tank 18 also has a venting outlet 38 at its top communicating with vent line 40 which may be opened or closed by valve 42. A liquid level controller 44 is connected to tank 18 at a desired vertical location 46 providing signals for operation of a control valve 50 across line 52 connected to outlet 54 at the bottom of the tank.

In initiating operation of the system, assuming tank 14 contains a slurry under high pressure and that tank 18 is isolated with all valves closed and at low pressure, valve 36 is opened to pressurize tank 18. Only gas or vapor flows through valve 36 until pressure is equalized between the two tanks. Valve 36 is then closed, the valve 32 is opened. At this time, there is no pressure differential across valve 32, and only a low flow occurs due to the liquid head in tank 14. Valve 42 is then opened, venting tank 18 to atmosphere or a vent system. Pressure in tank 18 drops rapidly, and liquid flow through valve 32 increases rapidly, up to a limit imposed by choke 34. Pressure drop across valve 32 increases only while this valve is fully opened, and the maximum pressure drop is a small fraction of the total pressure differential between tanks 14 and 18. Upon reaching atmospheric pressure in tank 18 by venting through valve 42, valve 50 is opened, releasing the slurry for discharge through line 56. Liquid level in tank 18 may be maintained at a desired level by means of liquid level controller 44 operably connected for throttling flow through valve 50 as required.

Once steady-state operation is obtained, flow through the choke and valve 32 remains nearly constant. If it is desired to transfer at other flow rates, a parallel discharge line including a valve 32' and a choke 34' as shown in dotted lines may be added to the system. Choke 34' in this line is designed to provide a different flow rate than obtained from choke 34. Three different constant flow rates are then available since operation is possible with choke 34, with choke 34', or with both chokes. Additional flow rates can be made available by providing more parallel lines with valves and chokes. In order to change flow rates, it is necessary to shut down all flow, repressurize tank 18, and activate the desired choke assemblies simultaneously.

Components used in the system may comprise conventional pressure tanks, valves, and piping for the embodiment shown. Remotely operated, full flow-type valves such as ball valves may be used. The choke may be a drilled tube of the type used in oil well discharge lines, for example, the flow-type choke available from Barton Valve Company.

Sizing of the valve 42 and tank 18 relatively to choke 34 is important in that the pressure in the tank must reach atmospheric, or the desired operating pressure, before the liquid level reaches venting outlet 38. For example, vent line 40 must be large enough to permit the gas to escape before the accumulation of slurry fills the volume of tank 18.

Systems embodying the invention may be used for various types of slurries such as aqueous or organic liquid slurries or char, ash, catalyst, or other solids at pressures ranging from several hundred to several thousand psia. Particular areas for application exist in coal gasification and ore processing.

While the invention is described above with respect to a specific embodiment, it is not to be understood as limited thereto but is limited only as indicated by the appended claims.

I claim:

1. A method of transferring a liquid slurry containing solid particles from containment in liquid phase in a pressurized container having a gas outlet above the liquid phase and a liquid outlet below the liquid phase therein which comprises:

providing a letdown container disposed below the pressurized container so that the liquid may flow by gravity into said letdown container, pressurized gas transfer means including a first valve communicating the containers above the liquid levels therein, liquid transfer means communicating the containers and including a second valve and a choke, vent means including a third valve for releasing gas pressure from said letdown container, and outlet means including a fourth valve for releasing liquid from said letdown container;

closing said second, third, and fourth valves and opening each first valve, whereby pressure in said containers is equalized;

closing said first valve and opening said second valve, whereby flow of liquid under a low-pressure differential occurs;

opening said third valve, whereby said letdown tank is vented, and liquid flows through said second valve, with its flow being restricted by said choke; and opening said fourth valve, whereby said liquid is released.

2. A method as defined in claim 1 including maintaining the liquid in said letdown container at a predetermined level.

3. A method as defined in claim 2 including controlling flow through said fourth valve in response to liquid level in said letdown container.

* * * * *